United States Patent
Morioka et al.

(10) Patent No.: US 10,477,464 B2
(45) Date of Patent: Nov. 12, 2019

(54) COMMUNICATION DEVICE AND COMMUNICATION METHOD

(71) Applicant: SONY CORPORATION, Tokyo (JP)

(72) Inventors: Yuichi Morioka, Kanagawa (JP); Masahito Mori, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/557,966

(22) PCT Filed: Feb. 23, 2016

(86) PCT No.: PCT/JP2016/055288
§ 371 (c)(1),
(2) Date: Sep. 13, 2017

(87) PCT Pub. No.: WO2016/181682
PCT Pub. Date: Nov. 17, 2016

(65) Prior Publication Data
US 2018/0063775 A1    Mar. 1, 2018

(30) Foreign Application Priority Data
May 8, 2015  (JP) .................................. 2015-095427

(51) Int. Cl.
*H04W 24/02*    (2009.01)
*H04W 48/16*    (2009.01)
(Continued)

(52) U.S. Cl.
CPC .......... *H04W 48/16* (2013.01); *H04W 52/02* (2013.01); *H04W 52/0238* (2013.01);
(Continued)

(58) Field of Classification Search
None
See application file for complete search history.

(56) References Cited

U.S. PATENT DOCUMENTS

2009/0040965 A1* 2/2009 Matsuo ............ H04W 52/0216
370/328
2012/0063433 A1 3/2012 Wentink
(Continued)

FOREIGN PATENT DOCUMENTS

JP    2004-40373 A    2/2004
JP    2009-44650 A    2/2009
(Continued)

OTHER PUBLICATIONS

International Search Report dated May 17, 2016 in PCT/JP2016/055288 filed Feb. 23, 2016.
(Continued)

*Primary Examiner* — Ayanah S George
(74) *Attorney, Agent, or Firm* — Xsensus LLP

(57) ABSTRACT

[Object] To provide a communication device and communication method that are capable of both efficiently utilizing wireless communication resources and reducing electric power consumption in a frame exchange period with a communication device different from an own device.
[Solution] A communication device includes a communication unit configured to receive a first frame from a first communication device, the first frame being addressed to a second communication device that is different from the own device. The first frame includes information indicating a frame exchange period and information on whether the frame exchange period is changed. In addition, a communication device includes a communication unit configured to transmit a first frame that includes information indicating a frame exchange period and information on whether the frame exchange period is changed.

20 Claims, 13 Drawing Sheets

(51) Int. Cl.
  *H04W 52/02* (2009.01)
  *H04W 74/02* (2009.01)
  *H04W 84/12* (2009.01)
  *H04W 56/00* (2009.01)

(52) U.S. Cl.
  CPC ....... *H04W 56/0015* (2013.01); *H04W 74/02* (2013.01); *H04W 84/12* (2013.01); *Y02D 70/00* (2018.01); *Y02D 70/1222* (2018.01); *Y02D 70/142* (2018.01); *Y02D 70/164* (2018.01); *Y02D 70/166* (2018.01); *Y02D 70/168* (2018.01); *Y02D 70/21* (2018.01)

(56) References Cited

U.S. PATENT DOCUMENTS

2015/0063251 A1* 3/2015 Asterjadhi ............ H04W 74/04
  370/329
2015/0373716 A1* 12/2015 Su .......................... H04W 4/80
  370/338

FOREIGN PATENT DOCUMENTS

| JP | 2014-207693 A | 10/2014 |
|---|---|---|
| WO | 2007013934 A2 | 2/2007 |

OTHER PUBLICATIONS

Extended European Search Report dated Nov. 15, 2018, issued in corresponding European Patent Application No. 16792408.3.

* cited by examiner

COMMUNICATION DEVICE AND COMMUNICATION METHOD

TECHNICAL FIELD

The present disclosure relates to communication devices and communication methods.

BACKGROUND ART

In recent years, wireless local area networks (LANs) as typified by IEEE (Institute of Electrical and Electronics Engineers) 802.11 have been widespread. In addition, along with the widespread use of wireless LANs, products supporting the wireless LANs have been increasing. Therefore, frequency of occurrence of so-called hidden node problems has increasing, and establishment of communication becomes likely to be failed.

On the other hand, IEEE 802.11 specifies a mechanism that decides a communication device for establishing communication through exchange of a request-to-send (RTS) frame and a clear-to-send (CTS) frame, and stops frame transmission from another communication device in a period in which a frame is exchanged through the communication (hereinafter, also referred to as a network allocation vector (NAV) period).

In the NAV period, the another communication device whose frame transmission is stopped does not perform communication. Therefore, in view of electric power saving, it is preferable to further stop frame reception of the another communication device.

For example, Patent Literature 1 discloses an invention of a communication device that stops supplying electric power or a synchronization signal to a reception circuit in a NAV period in the case where an own device is a third communication device that does not perform communication in the NAV period.

CITATION LIST

Patent Literature

Patent Literature 1: JP 2004-040373A

DISCLOSURE OF INVENTION

Technical Problem

However, according to the invention disclosed in Patent Literature 1, sometimes it is difficult to efficiently utilize a wireless communication resource when a NAV period is changed in the NAV period.

For example, in the case where a NAV period is extended in the NAV period, a frame for notifying of the extension of the NAV period is transmitted. However, the frame indicating the extension is not received because operation of a reception circuit is stopped in the third communication device. Therefore, it is possible that the third communication device starts frame transmission after the NAV period before extension has elapsed, and frame collision may occur.

In addition, in the case where a NAV period is shortened in the NAV period, a frame for notifying of stop of the NAV period is transmitted. However, as described above, the third communication device does not receive the frame. Therefore, until the NAV period expires, the third communication device does not transmit a frame even though there is a sufficient wireless communication resource.

Accordingly, the present disclosure proposes a novel and improved communication device and communication method that are capable of both efficiently utilizing wireless communication resources and reducing electric power consumption in a frame exchange period with a communication device different from an own device.

Solution to Problem

According to the present disclosure, there is provided a communication device including a communication unit configured to receive a first frame from a first communication device, the first frame being addressed to a second communication device that is different from the own device. The first frame includes information indicating a frame exchange period and information on whether the frame exchange period is changed.

In addition, according to the present disclosure, there is provided a communication device including a communication unit configured to transmit a first frame that includes information indicating a frame exchange period and information on whether the frame exchange period is changed.

In addition, according to the present disclosure, there is provided a communication method including receiving, by a communication unit, a first frame from a first communication device, the first frame being addressed to a second communication device that is different from the own device. The first frame includes information indicating a frame exchange period and information on whether the frame exchange period is changed.

In addition, according to the present disclosure, there is provided a communication method including transmitting, by a communication unit, a first frame that includes information indicating a frame exchange period and information on whether the frame exchange period is changed.

Advantageous Effects of Invention

As described above, according to the present disclosure, there is provided the communication device and communication method that are capable of both efficiently utilizing wireless communication resources and reducing electric power consumption in a frame exchange period with a communication device different from an own device. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
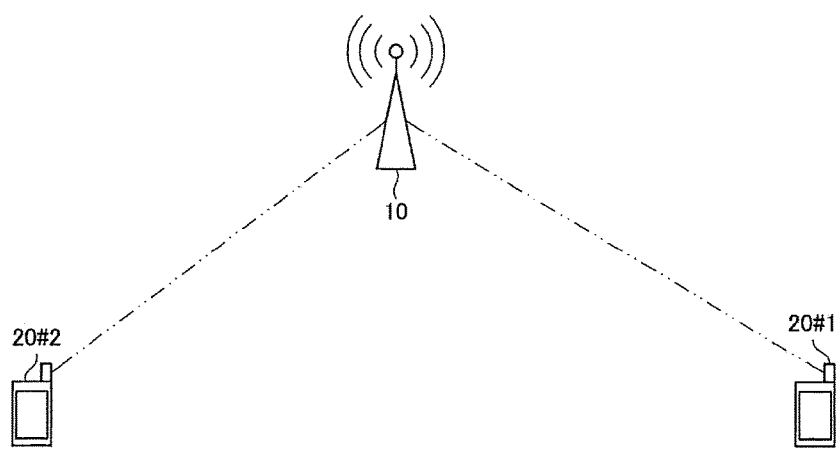
FIG. 1 is a diagram illustrating a configuration example of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like an STA 20#1 and an STA 20#2. However, in a case where it is unnecessary to distinguish structural elements having substantially the same function, only the same reference numeral is added. For example, in a case where it is unnecessary to particularly distinguish the STA 20#1 and the STA 20#2, they are simply referred to as "STAs 20."

Note that, the description is given in the following order.
1. Overview of communication device according to embodiment of present disclosure
2. Communication device according to embodiment of present disclosure
2-1. Configuration of device
2-2. Technical feature
2-3. Process performed by device
2-4. Modification
3. Application example
4. Conclusion

1. OVERVIEW OF COMMUNICATION DEVICE ACCORDING TO EMBODIMENT OF PRESENT DISCLOSURE

First, with reference to FIG. 1, an overview of a communication device according to an embodiment of the present disclosure will be described. FIG. 1 is a diagram illustrating a configuration example of a communication system according to the embodiment of the present disclosure.

The communication system includes a communication device 10 and a plurality of communication devices 20. Each of the communication device 10 and the communication devices 20 includes a wireless communication function and RTS/CTS functions. In addition, the communication device 10 operates as an access point (hereinafter, also referred to as AP), and each of the communication devices 20 operates as a station (hereinafter, also referred to as STA). Hereinafter, the communication device 10 may be referred to as the AP 10, and the communication devices 20 may be referred to as the STAs 20. In addition, a set of the communication device 10 and the communication devices 20 may be referred to as the communication device 10 and the like.

Therefore, in the communication system, a communication device for transmitting a frame transmits an RTS frame and communicates with a communication device for transmitting a CTS frame that is a response to the RTS frame. In addition, a communication device that does not transmit a CTS frame stops frame transmission in a NAV period. This enables the communication system to avoid frame collision.

For example, as illustrated in FIG. 1, the communication system may include an AP 10, a STA 20#1, and a STA 20#2. The AP 10, the STA 20#1, and the STA 20#2 are connected with each other through wireless communication. Each of the AP 10, the STA 20#1, and the STA 20#2 directly transmits/receives frames to/from each other. For example, the AP 10 is a communication device supporting IEEE 802.11. The AP 10 is capable of communicating with each of the STA 20#2 and the STA 20#2 by using the RTS/CTS functions. Note that, communication between the STA 20#1 and the STA 20#2 is not performed because they are out of a communication range or a communication blocker is interposed therebetween, for example.

Figure 2:
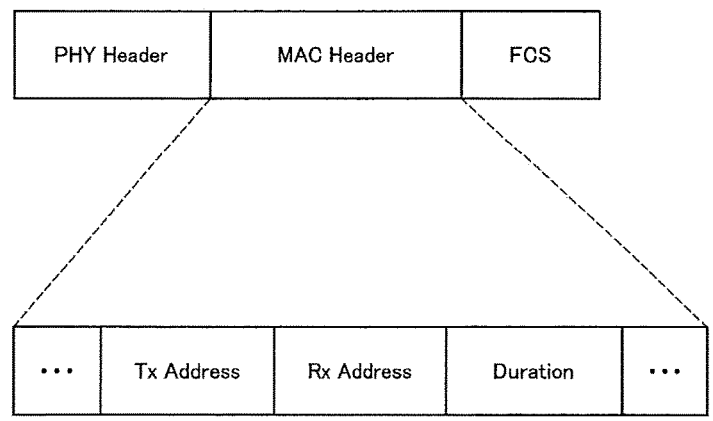
FIG. 2 is a diagram illustrating an example of a conventional frame configuration.
Figure 3:
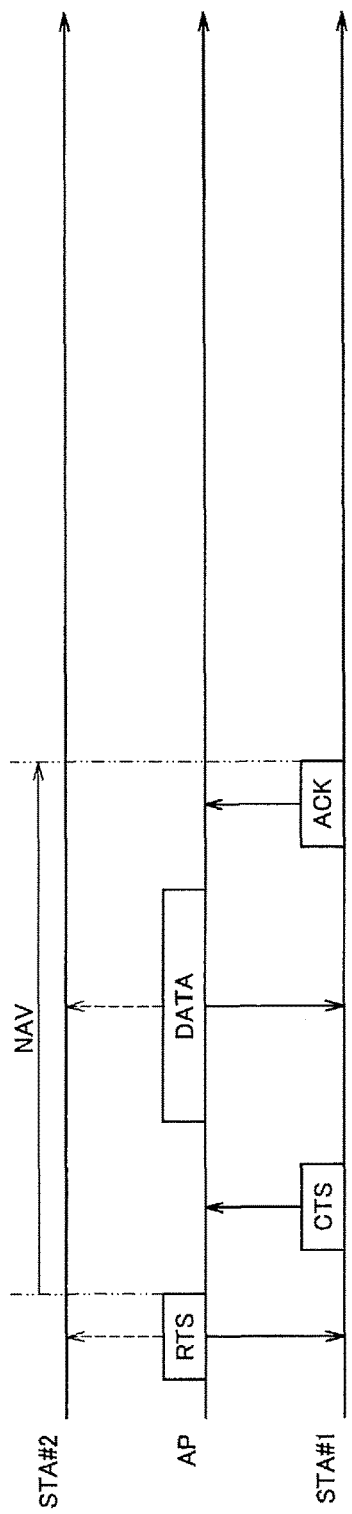
FIG. 3 is a diagram illustrating an example of a frame sequence in the case where a NAV period is not changed in communication between conventional communication devices.
Figure 4:
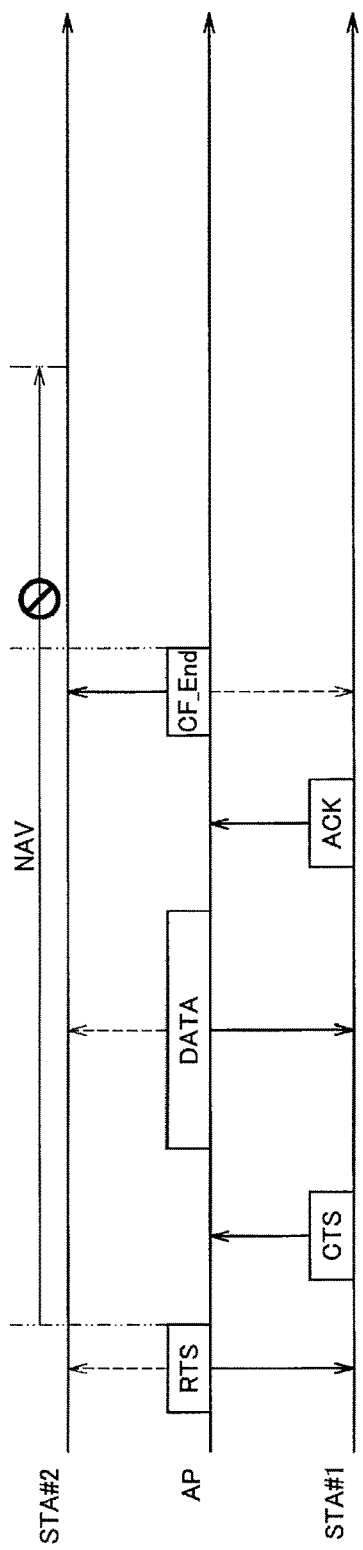
FIG. 4 is a diagram illustrating an example of a frame sequence in the case where a NAV period is shortened in communication between conventional communication devices.
Figure 5:
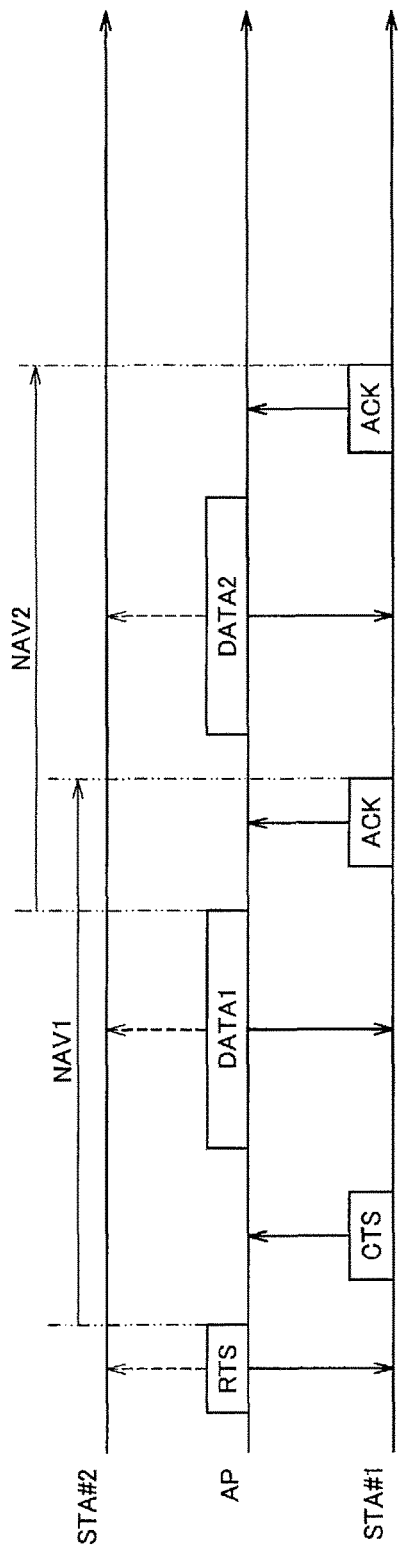
FIG. 5 is a diagram illustrating an example of a frame sequence in the case where a NAV period is extended in communication between conventional communication devices.

Here, when using conventional RTS/CTS functions, sometimes a NAV period is changed. Specifically, by using conventional RTS/CTS functions, sometimes a NAV period is shortened or extended. A communication device whose frame transmission is stopped in the NAV period (hereinafter, also referred to as a third party device) is notified of the shortening or the extension of the NAV period through a frame. In addition, with reference to FIGS. 2 to 5, conventional RTS/CTS functions will be described. FIG. 2 is a diagram illustrating an example of a conventional frame configuration. FIG. 3 is a diagram illustrating an example of a frame sequence in the case where a NAV period is not changed in communication between conventional communication devices. FIG. 4 is a diagram illustrating an example of a frame sequence in the case where a NAV period is shortened in communication between conventional communication devices. FIG. 5 is a diagram illustrating an example of a frame sequence in the case where a NAV period is extended in communication between conventional communication devices.

When frame transmission starts, a communication device having the conventional RTS/CTS functions (hereinafter, also referred to as a conventional communication device) transmits an RTS frame that includes information indicating a period of exchanging a frame. For example, as illustrated in the top of FIG. 2, the conventional communication device transmits an RTS frame including fields such as a physical layer (PHY) header, a media access control layer (MAC) header, and a frame check sequence (FCS) storing a cyclic redundancy check (CRC). In addition, in the RTS frame, the MAC header includes fields such as a transmitter (Tx)

address, a receiver (Rx) address, and duration. The duration field stores information indicating the period of exchanging the frame.

First, with reference to FIG. 3, a case will be described where a NAV period is not changed and data is transmitted from an AP to a STA #1.

The AP transmits an RTS frame addressed to the STA #1. The STA #1 that has received the RTS frame transmits a CTS frame to the AP. The CTS frame is a response to the RTS frame. In addition, when a STA #2 that is the third party device receives the RTS frame that is not addressed to the own device, the STA #2 stops frame transmission on the basis of information indicating a NAV period included in the RTS frame. Subsequently, the AP transmits a data frame to the STA #1 in the NAV period. When the STA #1 receives the data frame, the STA #1 transmits an ACK frame to the AP 10. The ACK frame is a response to the data frame. When the transmission of the ACK frame finishes, the NAV period expires. When the NAV period expires, the STA #2 cancels stopping of the frame transmission.

Next, with reference to FIG. 4, a case will be described where a NAV period is shortened (where the NAV period is stopped). Note that, description of sequences substantially the same as the sequence in the case where a NAV period is not changed is omitted.

In the case where communication with the STA #1 finishes ahead of a schedule, the AP transmits a CF_End frame addressed to the STA #2 after reception of an ACK frame that is a response to a data frame transmitted from the AP. The STA #2 that has received the CF_End frame determines that the NAV period has expired, and cancels stopping of the frame transmission.

Next, with reference to FIG. 5, a case will be described where a NAV period is extended. Note that, description of sequences substantially the same as the sequence in the case where a NAV period is not changed is omitted.

In the case where the communication period (that is, NAV period) between the AP and the STA #1 becomes longer than a scheduled NAV 1, the AP includes information indicating an extended NAV period in a data frame DATA1 addressed to the STA #1, and transmits the data frame DATA1. The STA #2 that has received the data frame DATA1 determines that the NAV period has extended, and extends a remaining period of stopping frame transmission to a NAV2.

As described above, in the case where it is possible to change a NAV period, it is necessary for a third party device to stands by until a frame is received. The frame includes information indicating the change in the NAV period. Therefore, when a reception circuit of the third party device is stopped in a NAV period to save electric power consumption, it becomes difficult for the third party device to recognize change in the NAV period. As a result, in the case where the NAV period is extended, the third party device may start frame transmission after the NAV period before extension has elapsed, and frame collision may occur. Alternatively, in the case where the NAV period is shortened, the third party device continues stopping frame transmission until the NAV period before the shortening is expired even though the NAV period expires. This may interfere with efficient utilization of wireless communication resources.

Accordingly, the present disclosure proposes the communication device capable of both efficiently utilizing wireless communication resources and reducing electric power consumption in a frame exchange period with a communication device different from the own device. Next, details thereof will be described. Note that, FIG. 1 illustrates the communication system including the AP 10 and the STAs 20 as an example of the communication system. One of the STAs 20 may be a communication device that establishes a plurality of direct links with other STAs 20 instead of the AP 10.

2. COMMUNICATION DEVICE ACCORDING TO EMBODIMENT OF PRESENT DISCLOSURE

As described above, the overview of the communication system according to the embodiment of the present disclosure has been described. Next, the AP 10 and the STAs 20 according to the embodiments of the present disclosure will be described.

<2-1. Configuration of Device>

Figure 6:
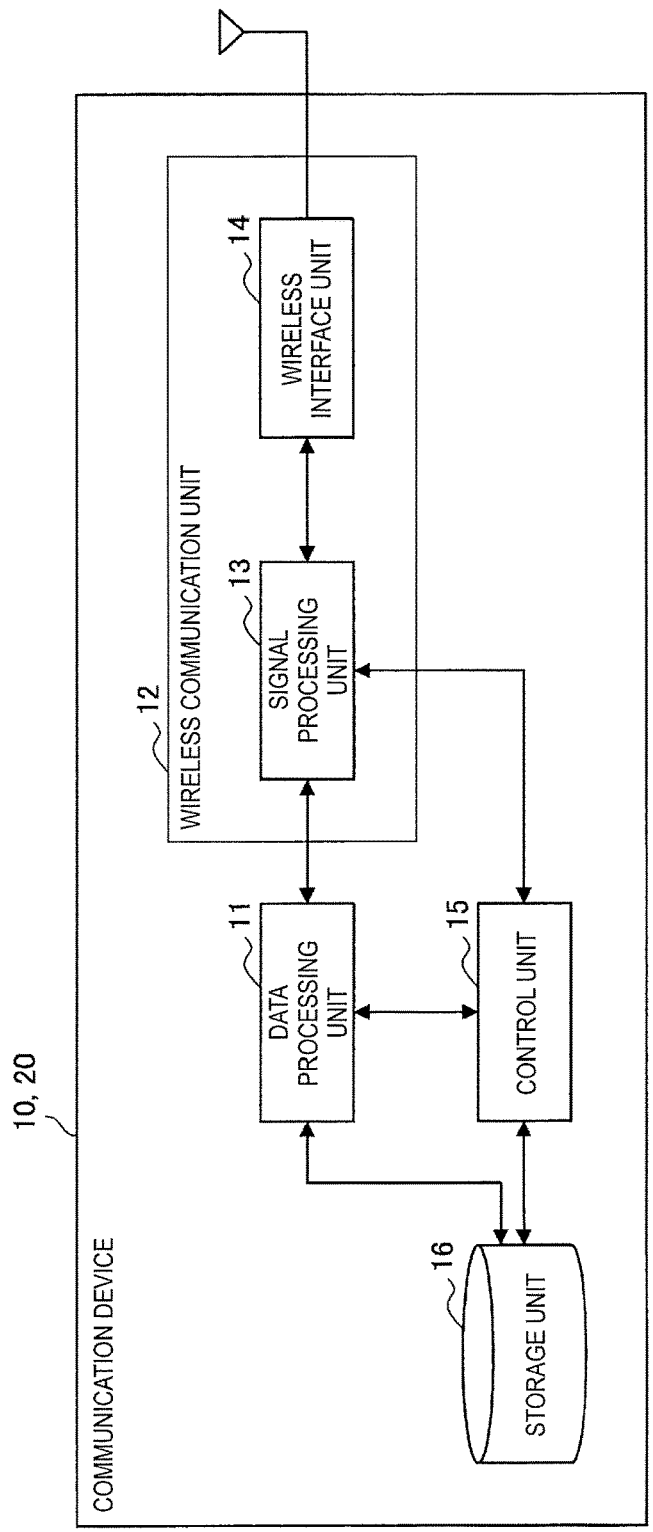
FIG. 6 is a block diagram illustrating an example of a schematic functional configuration of each of an AP and an STA according to an embodiment of the present disclosure.

First, with reference to FIG. 6, a basic functional configuration of each of the AP 10 and the STA 20 according to the embodiment of the present disclosure will be described. FIG. 6 is a block diagram illustrating an example of a schematic functional configuration of each of the AP and the STA 20 according to the embodiment of the present disclosure.

As illustrated in FIG. 6, each of the AP 10 and the STA 20 includes a data processing unit 11, a wireless communication unit 12, a control unit 15, and a storage unit 16.

As a part of a communication unit, the data processing unit 11 performs a process on data for transmission and reception. Specifically, the data processing unit 11 generates a frame on the basis of data from a higher layer of communication, and provides the generated frame to the wireless communication unit 12. For example, the data processing unit 11 generates a frame (or a packet) from the data, and performs a process on the generated frame such as addition of a MAC header for media access control (MAC), addition of an error detection code, or the like. In addition, the data processing unit 11 extracts data from the received frame, and provides the extracted data to the higher layer of communication. For example, the data processing unit 11 acquires data by analyzing a MAC header, detecting and correcting a code error, and performing a reorder process, or the like with regard to the received frame.

As a part of the communication unit, the wireless communication unit 12 includes a signal processing unit 13 and a wireless interface unit 14.

The signal processing unit 13 performs a signal process on a frame such as modulation. Specifically, the signal processing unit 13 generates symbol stream by encoding, interleaving, or modulating the frame provided by the data processing unit 11 in accordance with a cording or modulation method or the like set by the control unit 15. Next, the signal processing unit 13 provides the generated symbol stream to the wireless interface unit 14. In addition, the signal processing unit 13 acquires a frame by performing modulation, decoding, or the like on the symbol stream obtained through the process performed by the wireless interface unit 14, and provides the acquired frame to the data processing unit 11 or the control unit 15.

The wireless interface unit 14 transmits/receives a signal via an antenna. Specifically, the wireless interface unit 14 converts a signal related to the symbol stream obtained through the process performed by the signal processing unit 13 into an analog signal, amplifies the signal, filters the signal, and up-converts the frequency. Next, the wireless interface unit 14 transmits the processed signal via the antenna. In addition, on the signal obtained via the antenna, the wireless interface unit 14 performs a process that is opposite to the process at the time of signal transmission such as down-conversion in frequency or digital signal conversion.

As a part of the communication unit, the control unit 15 controls entire operation of the AP 10 or the STA 20. Specifically, the control unit 15 performs a process such as exchange of information between functions, setting of communication parameters, or scheduling of frames (or packets) in the data processing unit 11.

The storage unit 16 stores information to be used for process to be performed by the data processing unit 11 or the control unit 15. Specifically, the storage unit 16 stores information stored in a frame, information acquired from a frame, information on a communication parameter, or the like.

<2-2. Technical Feature>

Next, characteristic functions of the AP 10 and the STAs 20 according to the embodiments will be described.

(Function of Communication Device on an RTS Frame Transmission Side))

First, characteristic functions of the AP 10 and the STA 20 (hereinafter, also referred to as devices on transmission sides) in the case where they are on the RTS frame transmission side will be described.

(Transmission of RTS Frame Including Static NAV Flag)

Figure 7:
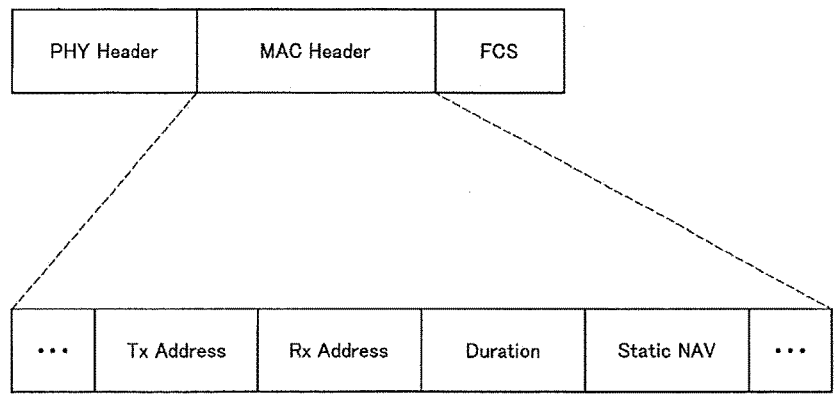
FIG. 7 is a diagram illustrating a configuration example of an RTS frame transmitted by a communication device according to the embodiment.

As a first communication device, a device on the transmission side transmits a frame that includes information indicating a frame exchange period and information on whether the frame exchange period is changed, as a first frame. Specifically, when a frame transmission request is issued, the control unit 15 determines whether a frame exchange period (in other words, NAV period) of the frame is changed. In the case where it is determined that the NAV period is not changed, the control unit 15 causes the data processing unit 11 to generate a frame that includes information indicating that the NAV period is unchanged. Next, the wireless communication unit 12 transmits the generated frame. Note that, in the frame exchange period, communication is performed only between the device on the transmission side and a communication device that is a destination of the frame that includes the information indicating that the NAV period is unchanged. For example, the frame that includes information indicating that the NAV period is unchanged may be an RTS frame. Next, with reference to FIG. 7, a configuration of the RTS frame according to the embodiment will be described. FIG. 7 is a diagram illustrating a configuration example of an RTS frame transmitted by the communication device 10 or the like according to the embodiment.

For example, as illustrated in FIG. 7, the device on the transmission side transmits an RTS frame including fields such as a PHY header, a MAC header, and an FCS. In the RTS frame, the MAC header includes a field of a static NAV in addition to a TX address, an Rx address, and duration. The duration field stores information indicating a NAV period, and the static NAV field stores NAV attribute information. As information indicating that the NAV period is unchanged, the NAV attribute information may be a flag (hereinafter, also referred as a static NAV flag) indicating that the NAV period is static.

Subsequently, in the case where it is determined that the NAV period is not changed, the control unit 15 sets the static NAV flag in the RTS frame to ON. For example, the control unit 15 causes the data processing unit 11 to generate an RTS frame in which a value of "1" is stored in the static NAV.

((Function of Communication Device that Performs Communication as Device on RTS Frame Reception Side))

Next, characteristic functions of the AP 10 and the STA 20 (hereinafter, also referred to as devices that operate on reception sides) that perform communication in the case where they are on the RTS frame reception side will be described.

(Reception of RTS Frame Including Static NAV Flag)

As a second communication device, the device that operates on the reception side receives an RTS frame that is addressed to the own device and transmitted from the device on the transmission side. Specifically, the wireless communication unit 12 receives the RTS frame, and the data processing unit 11 acquires the address of the received RTS frame. Next, in the case where the control unit 15 determines whether the acquired address of the RTS frame is the own device and determines that the address is the own device, the control unit 15 starts communication with the device on the transmission side.

(Transmission of CTS Frame Including Static NAV Flag)

When the RTS frame addressed to the own device is received, the device that operates on the reception side transmits a CTS frame that is a response to the RTS frame. Specifically, in the case where it is determined that the RTS frame addressed to the own device is received, the control unit 15 causes the data processing unit 11 to generate the CTS frame that includes information on whether the frame exchange period is changed. The information is included in the RTS frame. Next, the wireless communication unit 12 transmits the generated CTS frame. For example, the control unit 15 copies a static NAV flag included in a static NAV field in the received RTS frame, and stores the static NAV flag copied through the data processing unit 11 in a static NAV field in the CTS frame.

((Function of Communication Device that Sleeps as Device on RTS Frame Reception Side))

Next, characteristic functions of the AP 10 and the STA 20 (hereinafter, also referred to as devices that sleep on reception sides) that do not perform communication in the case where they are on the RTS frame reception sides will be described.

(Reception of RTS Frame Including Static NAV Flag)

A device that sleeps on the reception side receives an RTS frame from the device on the transmission side as the first frame. The RTS frame is addressed to a device that operates on the reception side but that is different from the own device. In addition, the RTS frame includes information indicating a frame exchange period and information on whether the frame exchange period is changed. Specifically, when the RTS frame is received, the control unit 15 determines whether the RTS frame is addressed to the own device. Next, in the case where it is determined that the RTS frame is not addressed to the own device, the control unit 15 determines whether to stop frame reception in the NAV period on the basis of the static NAV flag included in the received RTS frame. Note that, even in the case where the CTS frame is received instead of the RTS frame, the control unit 15 operates in a way similar to the case where the RTS frame is received.

(Stopping of Transmission and Reception in NAV Period)

When the RTS frame that is not addressed to the own device is received, the device that sleeps on the reception side does not transmit or receive a frame in a NAV period indicated by information included in the RTS frame. Specifically, the control unit 15 determines whether to stop frame reception in the NAV period on the basis of the static NAV flag included in the received RTS frame. In the case where it is determined that the static NAV flag is turned on (in other words, the NAV period is not changed), the control unit 15 stops frame reception in the NAV period. Note that, of course, frame transmission is also stopped in the NAV period.

Figure 8:
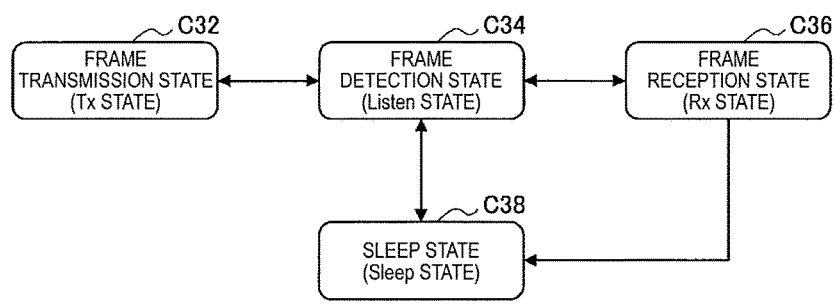
FIG. 8 is a diagram illustrating an example of a shift in states of a communication device according to the embodiment.

More specifically, the control unit 15 controls whether to stop transmission or reception of a frame by shifting a state of the own device. Next, with reference to FIG. 8, details of control of stopping the transmission/reception of a frame will be described. FIG. 8 is a diagram illustrating an example of a shift in states of the communication device 10 or the like according to the embodiment.

As illustrated in FIG. 8, the states of the communication device 10 or the like include a frame transmission state (Tx state) C32, a frame detection state (listen state) C34, a frame reception state (Rx state) C36, and a sleep state C38.

In the Tx state C32 and the Rx state C36, a frame is transmitted and received as the operating state. Specifically, in the Tx state C32 and the Rx state C36, the data processing unit 11, the wireless communication unit 12, and the control unit 15 are in operation. Therefore, larger electric power is consumed in the Tx state C32 and the Rx state C36 than the other states.

In the listen state C34, frame detection is performed as the operating state. Specifically, in the listen state C34, a preamble detection function in the signal processing unit 13, the wireless interface unit 14, and the control unit 15 are in operation. Therefore, smaller electric power is consumed in the listen state C34 than the Tx state C32 or the Rx state C36. Note that, when a preamble of a frame is detected in the listen state C34, the control unit 15 shifts the state of the own device to the Rx state C36, and causes the wireless communication unit 12 to receive the frame.

As the stop state, frame transmission/reception is not performed in the sleep state C38. Specifically, in the sleep state C38, only the control unit 15 is in operation. Therefore, smaller electric power is consumed in the sleep state C38 than the listen state C34. In other words, the electric power consumed in the sleep state C38 is the smallest in comparison with the other states.

Subsequently, in the case where an RTS frame is received and the RTS frame is addressed to the own device, the control unit 15 shifts the state among the states C32 to C36 in the NAV period, transmits an CTS frame, receives data frame, and transmits an ACK frame, for example.

On the other hand, in the case where the RTS frame is not addressed to the own device and a static NAV flag included in the RTS frame is OFF, the control unit 15 shifts the state among the states C34 to C36 in the NAV period, and receives only a frame transmitted from a device on the transmission side.

Alternatively, in the case where the RTS frame is not addressed to the own device and the static NAV flag included in the RTS frame is ON, the control unit 15 makes a decision about a shift to the stop state on the basis of the length of the NAV period and the length of recovery time from the stop state in which the frame is not transmitted or received to an operating state in which the frame is transmitted or received. Specifically, the communication unit 15 decides whether to shift to the stop state on the basis of the length of the NAV period and the length of the recovery time.

For example, in the case where the length of a recovery time from the sleep state C38 to the listen state C34 is longer than the length of the NAV period, the control unit 15 does not shifts the state of the own device to the sleep state C38. On the other hand, in the case where the length of the recovery time is shorter than the length of the NAV period, the control unit 15 shifts the state of the own device to the sleep state C38. This is because it is difficult to recover the state of the communication device 10 or the like to the operating state such as the listen state C34 in response to expiration of the NAV period in the case where the length of the recovery time is longer than the length of the NAV period.

Figure 9:
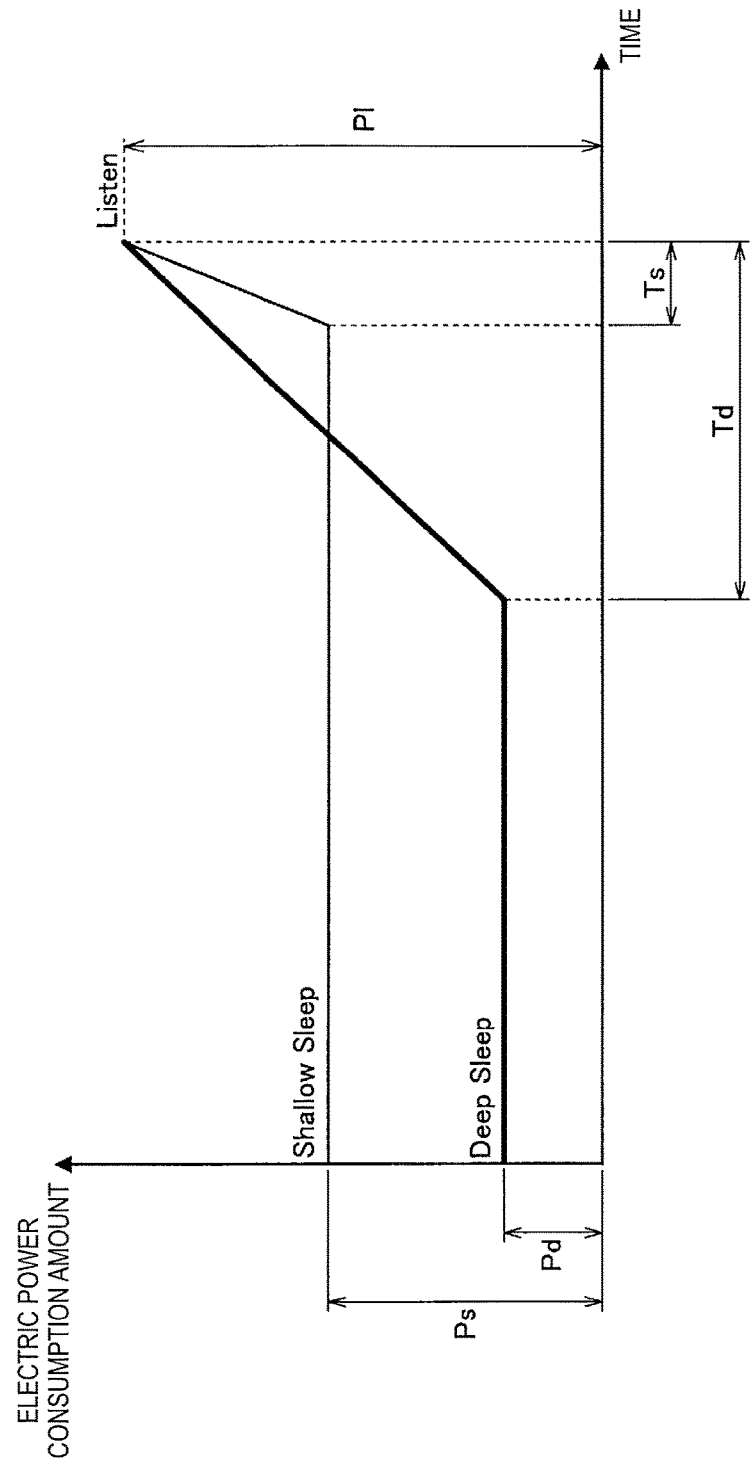
FIG. 9 is a diagram illustrating an example of a relation between an amount of electric power consumption and recovery time on a communication device in a stop state according to the embodiment.

In addition, the stop state includes a plurality of stop states having different lengths of recovery time. In the case of shifting a state to the stop state, the control unit 15 decides a stop state that is a shift destination among the plurality of stop states on the basis of the length of the NAV period and the lengths of the recovery time. With reference to FIG. 9, details of a process for deciding a stop state will be described. FIG. 9 is a diagram illustrating an example of a relation between an amount of electric power consumption and recovery time of the communication device 10 or the like in stop states according to the embodiment.

First, as the stop state, there are the plurality of stop states having different lengths of recovery time of. For example, as illustrated in FIG. 9, the sleep state includes two states: a shallow sleep state (hereinafter, also referred to as S-sleep state) and a deep sleep state (hereinafter, also referred to as D-sleep state). As illustrated in FIG. 9, the S-sleep state has a recovery time length Ts, and the D-sleep state has a recovery time length Td that is longer than Ts.

In addition, the lengths of the recovery time with respect to the stop states have negative correlations with amounts of electric power consumption in the stop states. For example, as illustrated in FIG. 9, the S-sleep state has an electric power consumption amount Ps per unit time, and the D-sleep state has an electric power consumption amount Pd per unit time. The electric power consumption amount Pd is smaller than Ps.

Here, the control unit 15 first tries to decide a stop state on the basis of the length of the NAV period and the lengths of recovery time in the plurality of stop states. For example, the control unit 15 selects the S-sleep state in the case where the length of the NAV period is longer than the recovery time length Ts in the S-sleep state and shorter than the recovery time length Td in the D-sleep state.

Alternatively, in the case where a stop state is not decided from the lengths of the recovery time and the length of the NAV period, the control unit 15 decides a stop state on the basis of amounts of electric power consumption in NAV periods in the respective stop states. For example, in the case where the length of the NAV period is longer than the recovery time length Td in the D-sleep state, the control unit 15 calculates electric power consumption amounts in NAV periods in the respective states by using the following equations 1 and 2.

[Math. 1]

$$Pn = Tn \times Pd + Td \times (Pl - Pd)/2 \quad \text{(Equation 1)}$$

[Math. 2]

$$Pn = Tn \times Ps + Ts \times (Pl - Ps)/2 \quad \text{(Equation 2)}$$

In the above-listed equations 1 and 2, Pn represents an amount of electric power consumption in a NAV period, and Tn represents the length of the NAV period. In addition, Pl represents an amount of electric power consumption per unit time in the listen state C34.

Subsequently, the control unit 15 selects, as the stop state, a state having electric power consumption smaller than the other states among electric power consumption amounts calculated by using the equations 1 and 2.

<2-3. Process Performed by Device>

Next, processes performed by a device on a transmission side, a device that operates on a reception side, and a sleeping device on the reception side (hereinafter, a set of the devices is also referred to as devices on the reception side) according to the embodiment will be described.

(Process Performed by Device on Transmission Side)

Figure 10:
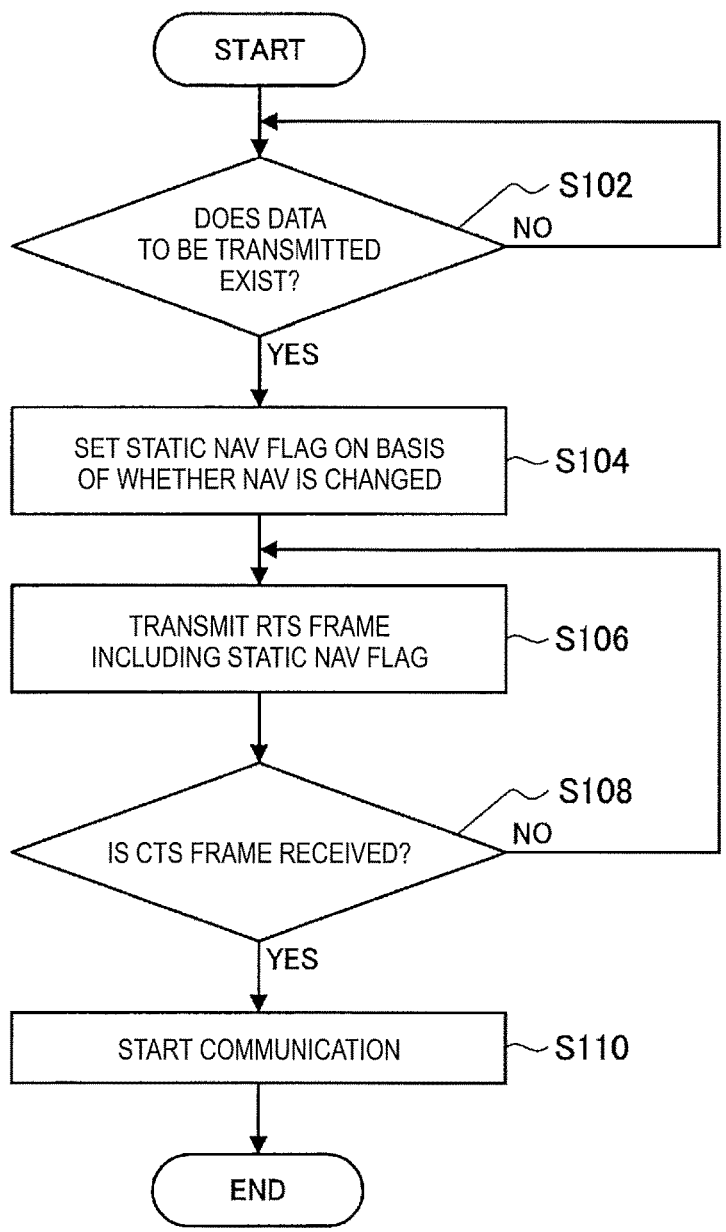
FIG. 10 is a flowchart illustrating a process performed in a device on a transmission side according to the embodiment.

First, with reference to FIG. 10, a process performed by a device on a transmission side according to the embodiment will be described. FIG. 10 is a flowchart schematically illustrating the process performed by the device on the transmission side according to the embodiment.

The device on the transmission side determines whether data to be transmitted exists (Step S102). Specifically, the control unit 15 determines whether a higher layer of communication such as an application operating in the device on the transmission side has issued a frame transmission request.

When it is determined that the data to be transmitted exists, the device on the transmission side sets the static NAV flag on the basis of whether the NAV is changed (Step S104). Specifically, when it is determined that the frame transmission request has been issued, the control unit 15 determines whether the NAV is changed. When it is determined that the NAV is not changed, the control unit 15 decides to set the value of the static NAV flag to ON.

Next, the device on the transmission side transmits an RTS frame including the static NAV flag (Step S106) Specifically, the control unit 15 causes the data processing unit 11 to generate the RTS frame including the static NAV flag whose value is ON, and the wireless communication unit 12 transmits the generated RTS frame.

Next, the device on the transmission side stands by until a CTS frame is received (Step S108). Specifically, the control unit 15 stands by until the wireless communication unit 12 receives the CTS frame that is a response to the RTS frame.

When the CTS frame is received, the device on the transmission side starts communication with a transmission source of the CTS frame (Step S110). Specifically, when the CTS frame is received, the device on the transmission side starts communication with the transmission source of the CTS frame. For example, the device on the transmission side transmits a data frame and receives an ACK frame that is a response to the data frame.

(Process Performed by Device on Reception Side)

Figure 11:
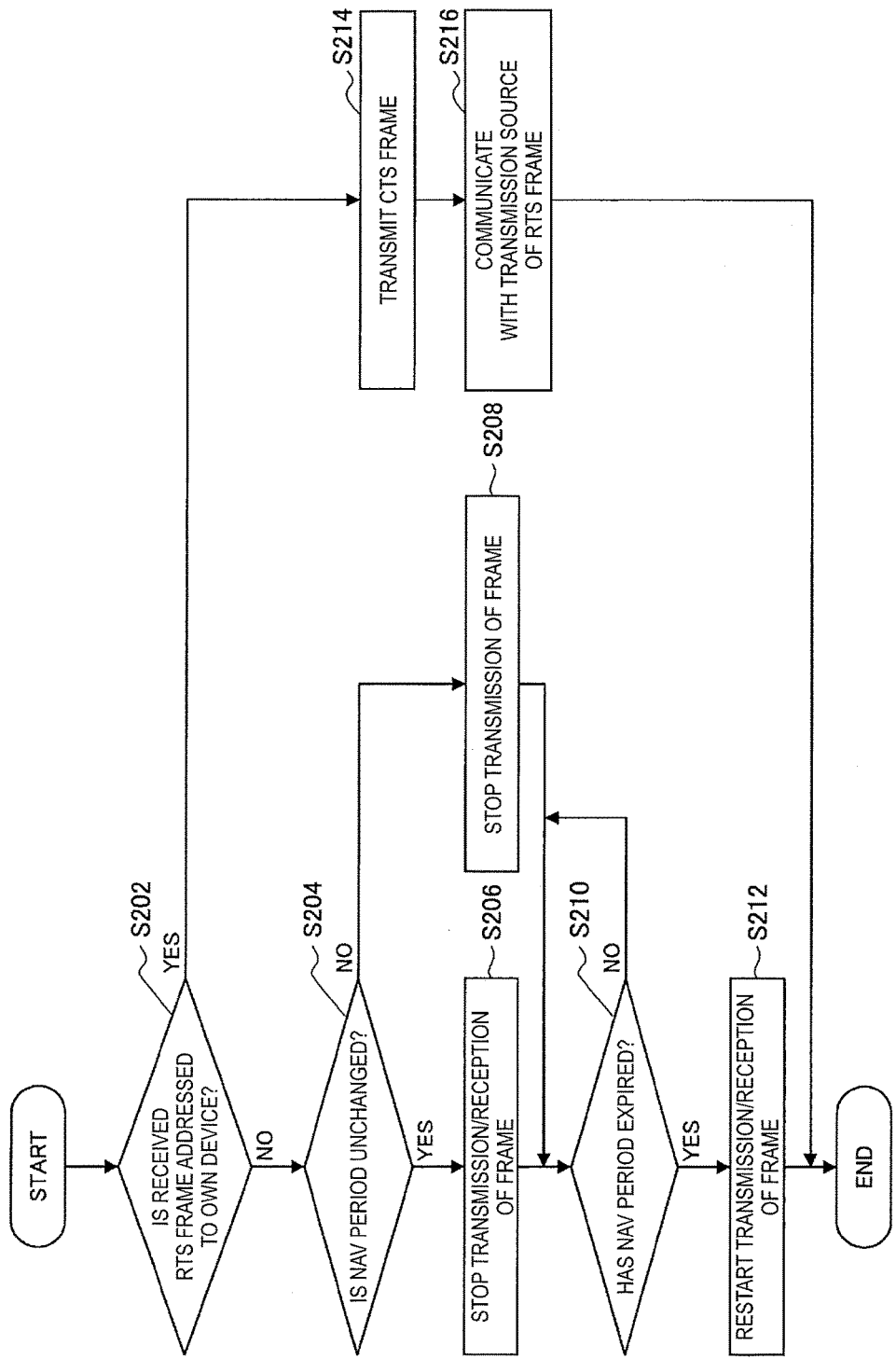
FIG. 11 is a flowchart illustrating a process performed in a device on a reception side according to the embodiment.

Next, with reference to FIG. 11, a process performed by a device on a reception side according to the embodiment will be described. FIG. 11 is a flowchart schematically illustrating the process performed by the device on the reception side according to the embodiment.

The device on the reception side determines whether the received RTS frame is addressed to the own device (Step S202). Specifically, when the RTS frame is received, the control unit 15 determines whether the RTS frame is addressed to the own device.

When it is determined that an RTS frame that is not addressed to the own device is received, the device on the reception side determines whether a NAV period is unchanged (Step S204). Specifically, when it is determined that the RTS frame is addressed to the own device, the control unit 15 determines whether the static NAV flag in the RTS frame is ON.

When it is determined that the NAV period is unchanged, the device on the reception side stops transmission/reception of the frame (Step S206). Specifically, when it is determined that the static NAV flag is ON, the control unit 15 determines whether to stop transmission/reception of the frame on the basis of the NAV period length and the recovery time lengths of the sleep states. When it is decided to shift to a sleep state, the control unit 15 shifts the state of the own device to the decided sleep state, and transmission/reception of the frame is stopped.

Note that, when it is determined that the static NAV flag is OFF, the device on the reception side stops transmission of the frame (Step S208). Specifically, when it is determined that the static NAV flag is OFF, the control unit 15 does not shift the state of the own device to the Tx state in the NAV period, and this results in stopping of the frame transmission.

Next, the device on the reception side stands by until the NAV period expires (Step S210). Specifically, in the case where the state of the own device is shifted to the sleep state, the control unit 15 keeps the own device in the sleep state until the NAV period expires. Alternatively, in the case where the state of the own device is not shifted to the sleep state, the control unit 15 keeps the own device in any of the listen state or the Rx state until the NAV period expires. This is because the NAV period may be changed in the case where the static NAV flag is OFF.

When the NAV period expires, the device on the reception side restarts transmission/reception of the frame (Step S212). Specifically, the control unit 15 cancels limitation on the state shifting destination when the NAV period expires. Especially, in the case where the state of the own device is the sleep state, the control unit 15 shifts the state of the own device to the operating state such as the listen state when the NAV period expires.

Note that, when it is determined that the RTS frame addressed to the own device is received, the device on the reception side transmits a CTS frame (Step S214). Specifically, when it is determined that the RTS frame is addressed to the own device, the control unit 15 causes the data processing unit 11 to generate the CTS frame that includes the static NAV flag included in the RTS frame, and the wireless communication unit 12 transmits the generated CTS frame. Note that, in the case where the RTS frame does not include the static NAV flag, the control unit 15 may cause the data processing unit 11 to generate a CTS frame that does not include the static NAV flag (in other words, static NAV field).

Next, the device on the reception side communicates with a transmission source of the RTS frame (Step S216). Specifically, after the CTS frame is transmitted, the device on the reception side starts communication with the transmission source of the RTS frame (in other words, the device on the transmission side). For example, the device on the reception side receives a data frame and transmits an ACK frame that is a response to the data frame. Here, the device on the reception side may transmit the ACK frame and the data frame that includes the static NAV flag included in the RTS frame. In addition, in the case where the RTS frame does not include the static NAV flag, the device on the reception side may transmit the ACK frame and the data frame that does not include the static NAV flag (in other words, the static NAV field).

As described above, according to the embodiment of the present disclosure, the device on the transmission side transmits the first frame that includes information indicating the frame exchange period and information on whether the frame exchange period is changed. In addition, the device on the reception side receives the first frame from the device on the transmission side. The first frame is addressed to the device on the reception side that is different from the own device. In addition, the first frame includes information indicating the frame exchange period and information on whether the frame exchange period is changed. Therefore, it is possible to efficiently utilize the right amount of wireless communication resources and it is possible to reduce electric power consumption in the frame exchange period by controlling stopping of frame transmission/reception in accordance with whether the frame exchange period is changed.

In addition, the information on whether the frame exchange period is changed includes information indicating that the frame exchange period is unchanged. Therefore, it is possible to utilize the wireless communication resources efficiently and more reliably by confirming that the frame exchange period is unchanged. Especially, the configuration according to the embodiment is effective in the case of scheduled communication, in the case of multicast communication of static data length, or the like.

In addition, in the above-described frame exchange period, communication is performed only between the device on the transmission side and the device that operates on the reception side. Therefore, it is possible to improve certainty of collision avoidance in the communication in the frame exchange period since the frame exchange period is a NAV period.

In addition, the first frame includes the RTS frame. Therefore, when the configuration according to the embodiment is applied to mechanisms used in the conventional communication, it is possible to utilize the wireless communication resource efficiently and more effectively and it is possible to reduce electric power consumption.

In addition, the first frame includes the CTS frame that includes information on whether the frame exchange period is changed. The information is included in the RTS frame. Therefore, when the configuration according to the embodiment is also applied to a communication device that does not receive the RTS frame but receives only the CTS frame, it is possible for the entire network to utilize the wireless communication resource more efficiently and to reduce electric power consumption.

In addition, in the case where the first frame is received, the device on the reception side does not transmit or receive a frame in the frame exchange period. Therefore, it is possible to further reduce the electric power consumption in the NAV period by stopping not only transmission of frames but also reception of frames.

In addition, the device on the reception side makes a decision about a shift to the stop state on the basis of the length of the frame exchange period and the length of recovery time from the stop state in which the frame is not transmitted or received to the operating state in which the frame is transmitted or received. Therefore, it is possible to suppress a space from opening in a wireless communication resource by recovering the state of the communication device from the stop state to the operating state in response to expiration of the NAV period, or it is possible to suppress electric power consumed by a device standing by in the operating state.

In addition, the device on the reception side decides whether to shift to the stop state on the basis of the length of the frame exchange period and the length of the recovery time. Therefore, it is possible to more reliably suppress a space from opening in a wireless communication resource by not shifting the state of the communication device to the stop state in the case where the recovery time length is longer than the NAV period length.

In addition, the stop state includes a plurality of stop states having different lengths of recovery time. The device on the reception side decides a stop state that is a shift destination among the plurality of stop states on the basis of the length of the frame exchange period and the lengths of the recovery time. Therefore, by selecting a stop state appropriate to the length of the NAV period, it is possible to suppress a space from opening in the wireless communication resource and obtain appropriate electric power consumption in the NAV period.

In addition, the lengths of the recovery time with regard to the stop states have negative correlations with amounts of electric power consumption in the stop states. Therefore, it is possible to further reduce the electric power consumption by selecting a stop state having longer recovery time length.

<2-4. Modification>

The embodiment of the present disclosure has been described above. Note that, the present embodiment is not limited to the above described examples. Next, a modification of the present embodiment will be described.

Figure 12:
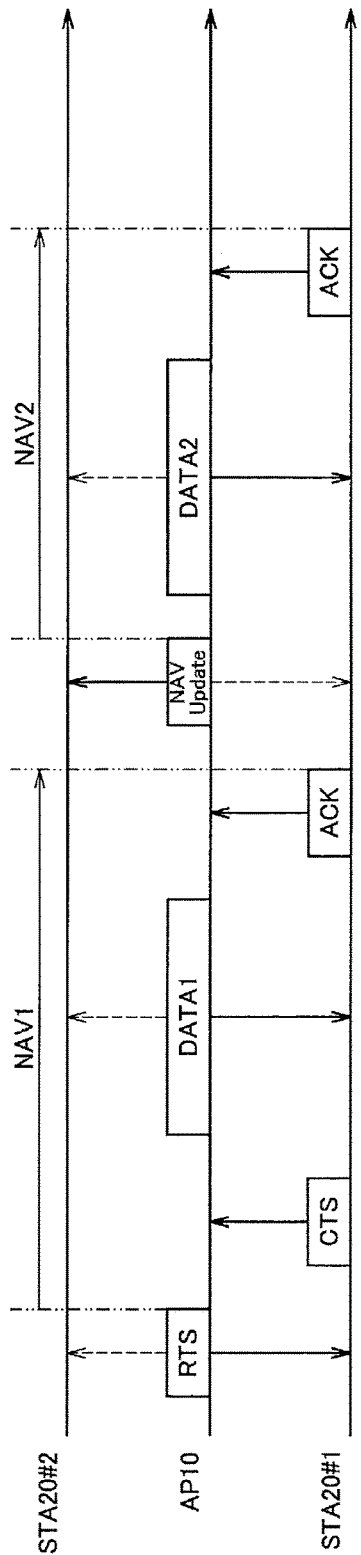
FIG. 12 is a diagram illustrating an example of a frame sequence in the case where a NAV period is extended in communication between communication devices according to a modification of the embodiment.

According to the modification of the embodiment, a NAV period may be extended even in the case of transmitting a frame that includes information indicating that the NAV period is unchanged. Specifically, in the case where the NAV period is extended, the device on the transmission side transmits a second frame that includes information indicating the extended NAV period after the NAV period has elapsed. In addition, when the NAV period has elapsed, a sleeping device on the reception side receives the second frame that includes the information indicating the extended NAV period. Next, with reference to FIG. 12, details of a process according to the modification will be described. FIG. 12 is a diagram illustrating an example of a frame sequence in the case where a NAV period is extended in communication with the communication device 10 or the like according to the modification.

First, for example, an AP 10 serving as the device on the transmission side transmits an RTS frame addressed to a STA 20#1 serving as the device on the reception side. The STA 20#1 that has received the RTS frame transmits a CTS frame to the AP 10. Alternatively, in the case where an RTS frame that is not addressed to the own device is received and the RTS frame includes the static NAV flag whose value is ON, a STA 20#2 serving as the device on the reception side stops transmission/reception of the frame in a NAV period NAV1. Subsequently, in the NAV1, the AP 10 and the STA 20#2 exchanges data frame DATA1 and an ACK frame.

Here, in the case where a NAV period extension request is issued in the NAV period after transmission of the RTS frame, the device on the transmission side transmits the second frame that includes information indicating the extended NAV period when the NAV period before the extension expires. For example, when the NAV period extension request is issued as illustrated in FIG. 12, the AP 10 transmits a NAV update frame addressed to the STA 20#2 at an expiration timing of the NAV1 that is the NAV period before the extension. The NAV update frame is a frame for notifying of extension of the NAV period as the second frame. Next, the STA 20#2 that has received the NAV update frame stops at least transmission of frames in NAV2 that is the extended NAV period included in the NAV update frame. Subsequently, the AP 10 and the STA 20#1 exchanges a data frame DATA2 and an ACK frame in the NAV2.

In addition, the device on the transmission side may include information on whether the NAV period is changed in the second frame. For example, the AP 10 transmits a NAV update frame including the static NAV flag to the STA 20#2. In the case where the static NAV flag is ON, the STA 20#2 that has received the NAV update frame stops transmission/reception of the frame (in other words, the STA 20#2 shifts the state of the own device to the sleep state) in the NAV2.

As described above, according to the modification of the embodiment, in the case where the NAV period is extended, the device on the transmission side transmits the second frame that includes information indicating the extended NAV period when the NAV period has elapsed. In addition, when the NAV period has elapsed, the device on the reception side receives the second frame that includes the information indicating the extended NAV period. Accordingly, when the state of a sleeping device on the reception side is again shifted to a state in which frame transmission is stopped before the sleeping device on the reception side that has been in the sleep state in the NAV period restarts the frame transmission, it is possible to avoid frame collision even in the case where the NAV period is extended in the NAV period.

In addition, the second frame includes information on whether the NAV period is changed. Therefore, it is possible to continuously reduce electric power consumption of the sleeping device on the reception side by shifting the state of the sleeping device on the reception side to the sleep state again in the extended NAV period.

3. APPLICATION EXAMPLE

The technology according to the present disclosure can be applied to various products. For example, the communication device 20 (that is, the STA 20) may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 20 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 20 may be wireless communication modules mounted in such terminals (for example, integrated circuit modules configured by one die).

On the other hand, for example, the communication device 10 (that is, the AP 10) may be realized as a wireless LAN access point (also referred to as a wireless base station) which has a router function or does not have a router function. The AP 10 may be realized as a mobile wireless LAN router. The AP 10 may also be a wireless communication module (for example, an integrated circuit module configured with one die) mounted on such a device.

3-1. First Application Example

Figure 13:
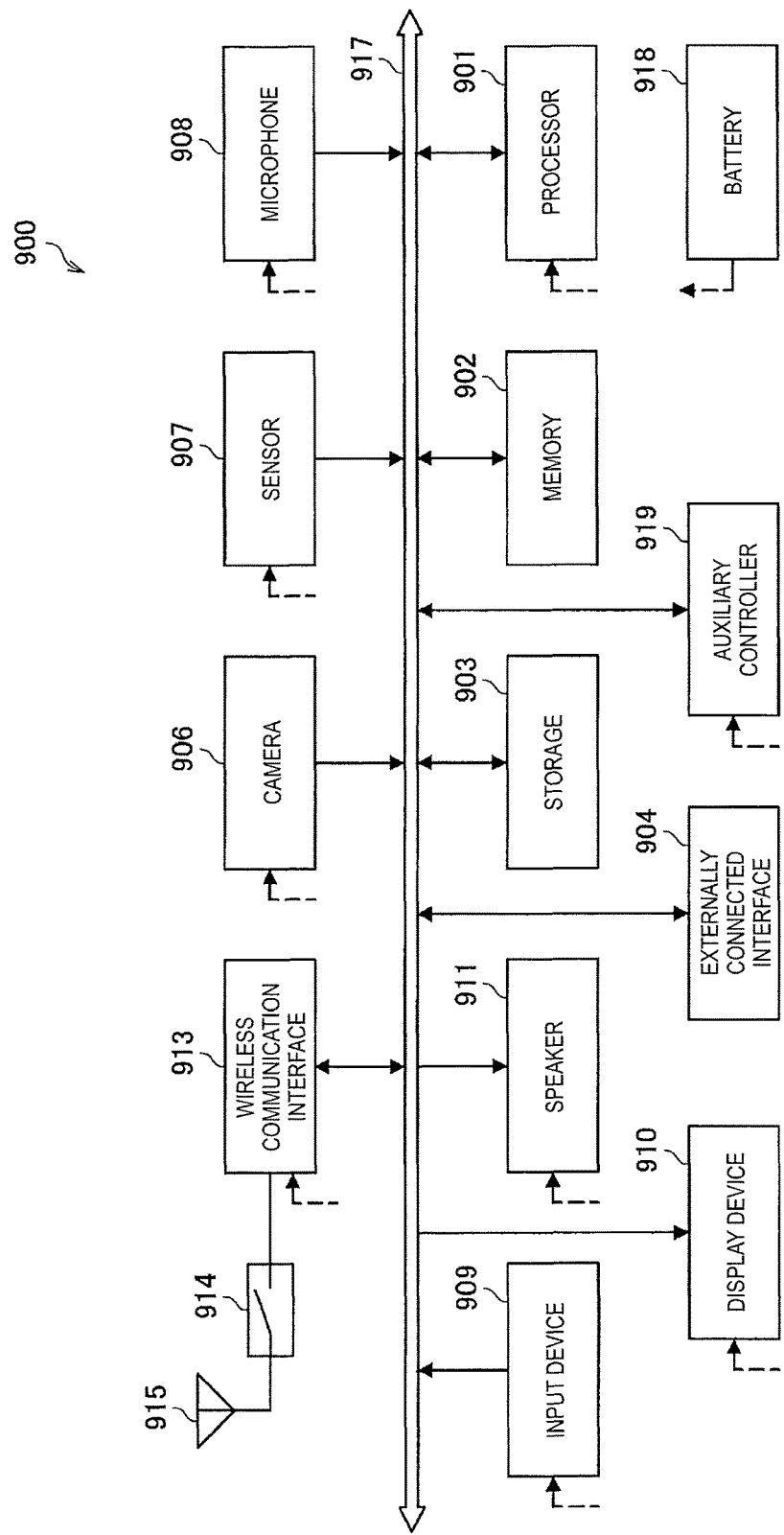
FIG. 13 is a block diagram illustrating an example of a schematic configuration of a smartphone.

FIG. 13 is a block diagram illustrating an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MEM antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 13. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 13 via power supply lines partially indicated by dashed lines in the drawing. The auxiliary controller 919 causes, for example, necessary minimum functions of the smartphone 900 to be operated in a sleep mode.

The data processing unit 11, the wireless communication unit 12, the control unit 15, and the storage unit 16 described with reference to FIG. 6 may be implemented by the wireless communication interface 913 in the smartphone 900 illustrated in FIG. 13. In addition, at least a part of these functions may be implemented by the processor 901 or the auxiliary controller 919. For example, when the wireless communication unit 12 receives a frame that includes information on whether a NAV period is changed, the control unit 15 controls operation of the data processing unit 11 and the wireless communication unit 12 on the basis of the information. Therefore, it is possible to efficiently utilize the right amount of wireless communication resources and it is possible to reduce electric power consumption in the NAV period by controlling stopping of frame transmission/reception in accordance with whether the NAV period is changed.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 14:
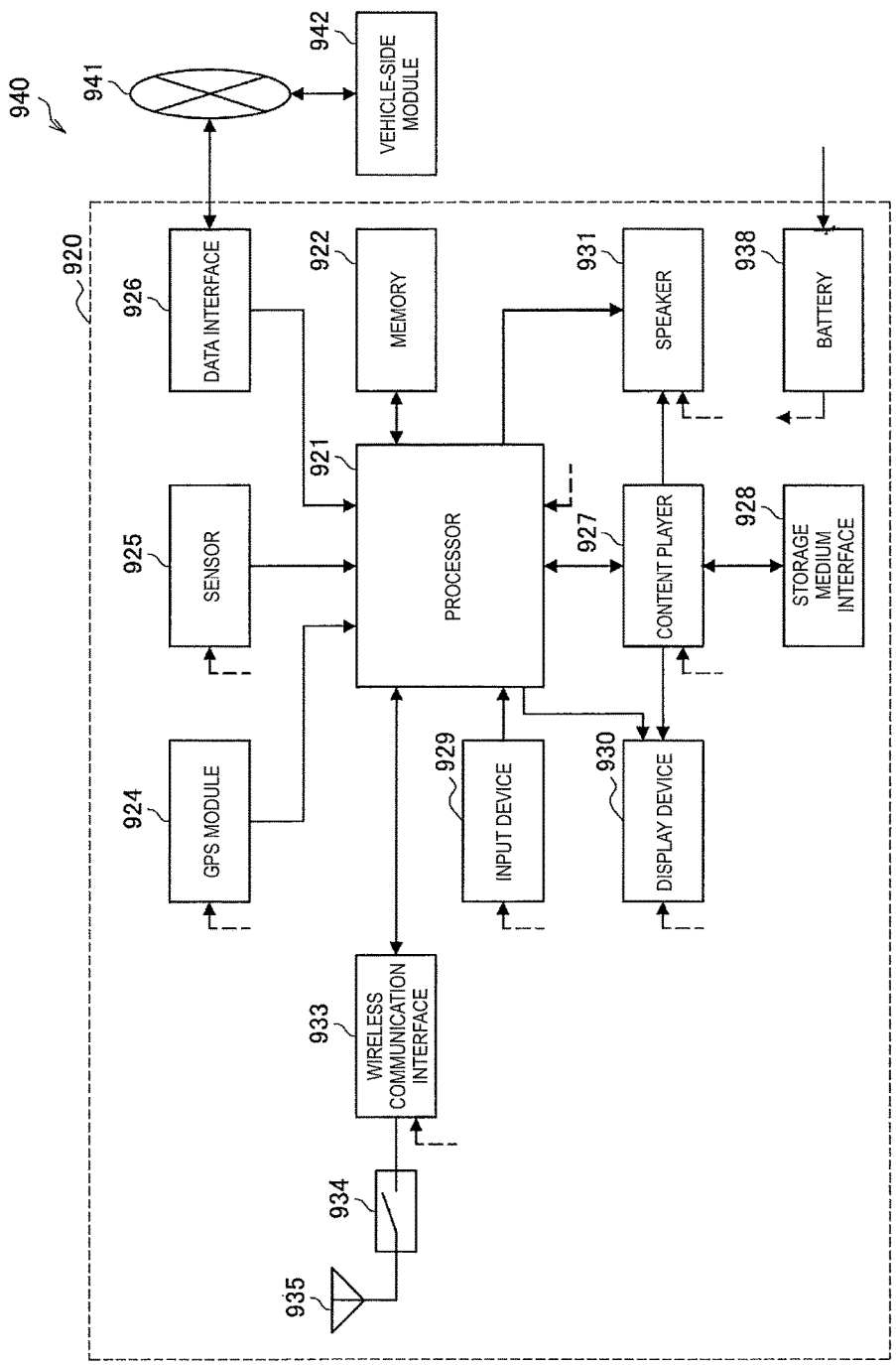
FIG. 14 is a block diagram illustrating an example of a schematic configuration of a car navigation device.

FIG. 14 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 14. In this case, the antenna switch 934 may be omitted from the configuration of the car navigation device 920.

The battery 938 supplies electric power to each of the blocks of the car navigation device 920 illustrated in FIG. 14 via power supply lines partially indicated by dashed lines in the drawing. In addition, the battery 938 accumulates electric power supplied from the vehicle side.

The data processing unit 11, the wireless communication unit 12, the control unit 15, and the storage unit 16 described with reference to FIG. 6 may be implemented by the wireless communication interface 933 in the car navigation device 920 illustrated in FIG. 14. In addition, at least a part of these functions may be implemented by the processor 921. For example, when the wireless communication unit 12 receives a frame that includes information on whether a NAV period is changed, the control unit 15 controls operation of the data processing unit 11 and the wireless communication unit 12 on the basis of the information. Therefore, it is possible to efficiently utilize the right amount of wireless communication resources and it is possible to reduce electric power consumption in the NAV period by controlling stopping of frame transmission/reception in accordance with whether the NAV period is changed.

In addition, the wireless communication interface 933 may operate as the AP 10 described above, and may establish wireless communication with a terminal held by a user in the car. In this case, for example, the control unit 15 in the wireless communication interface 933 transmits a frame via the wireless communication unit 12 and the data processing unit 11. The frame includes information on whether the NAV period is changed. Therefore, it is possible to reduce electric power consumption of a terminal that does not perform communication among terminals to be wirelessly connected in the case where the NAV period is not changed. In addition, it is possible to suppress frame collision occurred when a terminal that does not perform communication starts frame transmission in the case where the NAV period is changed.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

Figure 15:
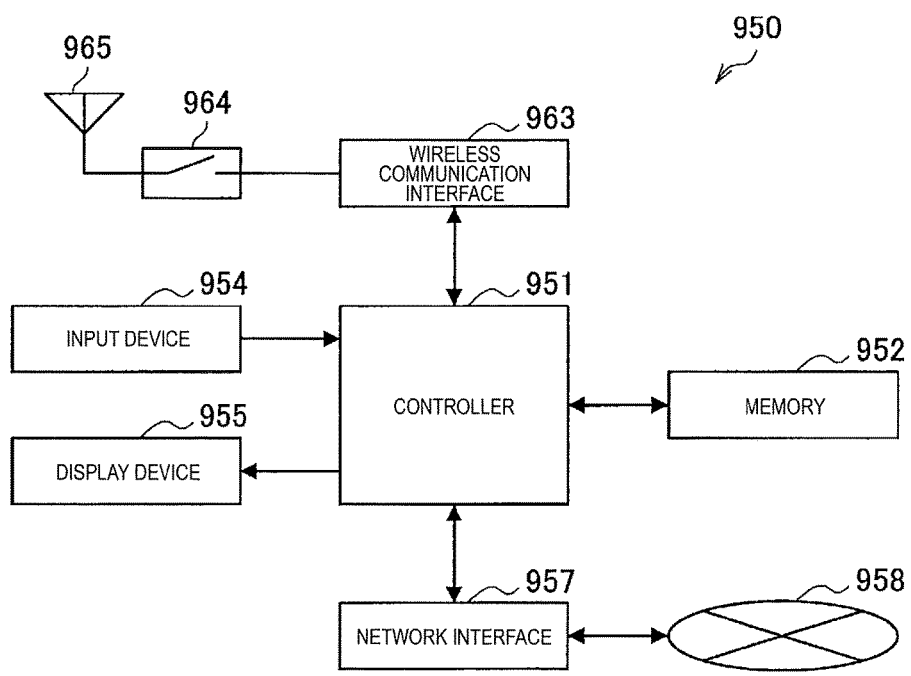
FIG. 15 is a block diagram illustrating an example of a schematic configuration of a wireless access point.

FIG. 15 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

The data processing unit 11, the wireless communication unit 12, the control unit 15, and the storage unit 16 described with reference to FIG. 6 may be implemented by the wireless communication interface 963 in the wireless access point 950 illustrated in FIG. 15. In addition, at least a part of these functions may be implemented by the controller 951. For example, the control unit 15 transmits a frame via the wireless communication unit 12 and the data processing unit 11. The frame includes information on whether the NAV period is changed. Therefore, it is possible to reduce electric power consumption of a device that does not perform communication in the case where the NAV period is not changed. In addition, it is possible to suppress frame collision occurred when a device that does not perform communication starts frame transmission in the case where the NAV period is changed.

4. CONCLUSION

As described above, according to the embodiment of the present disclosure, it is possible to efficiently utilize the right amount of wireless communication resources and it is possible to reduce electric power consumption in the NAV period by controlling stopping of frame transmission/reception in accordance with whether the NAV period is changed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above described embodiment, the information on whether the NAV period is changed is the static NAV flag indicating that the NAV period is unchanged. However, the present technology is not limited thereto. For example, the information on whether the NAV period is changed may be information indicating that the NAV period is not unchanged.

In addition, in the above described embodiment, the example has been described in which the static NAV field of the RTS frame includes information on a flag and the like regardless of whether the NAV period is changed. However, it is also possible to store information only in the case where the NAV is unchanged, or only in the case where the NAV is not unchanged.

In addition, in the above described embodiment, the example has been described in which the RTS frame or the CTS frame includes the information on whether the NAV period exists. However, the information on whether the NAV period exists may be included in any other frames. For example, the information on whether the NAV period is exists may be included in another control frame, a management frame, or a data frame. Alternatively, the information on whether the NAV period exists may be included in a trigger frame for notifying of start of transmission of a multicast frame.

In addition, in the above described embodiment, the example has been described in which the information indicating the extended NAV period is included in a dedicated frame such as the NAV update frame. However, the information indicating the extended NAV period may be included in any other frame. For example, the information indicating the extended NAV period may be included in a control frame, a management frame, or a data frame.

In addition, in the above described embodiment, the example has been described in which the RTS frame includes information indicating that the NAV period is unchanged. However, it is also possible that the RTS does not include the information but the information is included in a frame transmitted after transmission of the RTS frame. For example, the NAV update frame may include the static NAV flag whose value is ON.

In addition, in the above described embodiment, the example has been described in which the plurality of stop states are the shallow sleep state and the deep sleep state. However, of course, three or more stop states may be prepared. In this case, a formula for calculating electric power consumption is prepared for each of the stop states.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) A communication device including
a communication unit configured to receive a first frame from a first communication device, the first frame being addressed to a second communication device that is different from the own device,
in which the first frame includes information indicating a frame exchange period and information on whether the frame exchange period is changed.

(2) The communication device according to (1),
in which the information on whether the frame exchange period is changed includes information indicating that the frame exchange period is unchanged.

(3) The communication device according to (1) or (2),
in which, when the frame exchange period has elapsed, the communication unit receives a second frame that includes information indicating the frame exchange period that has been extended.

(4) The communication device according to any one of (1) to (3),
in which, in the frame exchange period, communication is performed only between the first communication device and the second communication device.

(5) The communication device according to any one of (1) to (4),
in which the first frame includes a request-to-send (RTS) frame.

(6) The communication device according to (5),
in which the first frame includes a clear-to-send (CTS) frame that includes information on whether the frame exchange period is changed, the information being included in the RTS frame.

(7) The communication device according to any one of (1) to (6),
in which, in the case where the first frame is received, the communication unit does not transmit or receive a frame in the frame exchange period.

(8) The communication device according to (7),
in which the communication unit makes a decision about a shift to a stop state on the basis of a length of the frame exchange period and a length of recovery time from the stop state in which the frame is not transmitted or received to an operating state in which the frame is transmitted or received.

(9) The communication device according to (8),
in which the communication unit decides whether to shift to the stop state on the basis of the length of the frame exchange period and the length of the recovery time.

(10) The communication device according to (8) or (9), in which
the stop state includes a plurality of stop states having different lengths of the recovery time, and
the communication unit decides a stop state that is a shift destination among the plurality of stop states on the basis of the length of the frame exchange period and the lengths of the recovery time.

(11) The communication device according to (10),
in which a length of the recovery time with regard to the stop state has a negative correlation with an amount of electric power consumption in the stop state.

(12) A communication device including
a communication unit configured to transmit a first frame that includes information indicating a frame exchange period and information on whether the frame exchange period is changed.

(13) The communication device according to (12),
in which, in the case where the frame exchange period is extended, the communication unit transmits a second frame that includes information indicating the frame exchange period that has been extended when the frame exchange period has elapsed.

(14) The communication device according to (13),
in which the second frame includes information on whether the frame exchange period is changed.

(15) A communication method including
receiving, by a communication unit, a first frame from a first communication device, the first frame being addressed to a second communication device that is different from the own device,
in which the first frame includes information indicating a frame exchange period and information on whether the frame exchange period is changed.

(16) A communication method including
transmitting, by a communication unit, a first frame that includes information indicating a frame exchange period and information on whether the frame exchange period is changed.

REFERENCE SIGNS LIST 10 communication device, AP
11 data processing unit
12 wireless communication unit
13 signal processing unit
14 wireless interface unit
15 control unit
16 storage unit
20 communication device, STA

The invention claimed is:

1. A communication device comprising:
circuitry configured to receive a first frame from a first communication device, the first frame being addressed to a second communication device that is different from the communication device,
wherein the first frame includes information indicating a frame exchange period and information on whether the frame exchange period is changed.

2. The communication device according to claim 1,
wherein the information on whether the frame exchange period is changed includes information indicating that the frame exchange period is unchanged.

3. The communication device according to claim 1,
wherein, when the frame exchange period has elapsed, the circuitry receives a second frame that includes information indicating the frame exchange period that has been extended.

4. The communication device according to claim 1, wherein, in the frame exchange period, communication is performed only between the first communication device and the second communication device.

5. The communication device according to claim 1, wherein the first frame includes a request-to-send (RTS) frame.

6. The communication device according to claim 5, wherein the first frame includes a clear-to-send (CTS) frame that includes information on whether the frame exchange period is changed, the information being included in the RTS frame.

7. The communication device according to claim 1, wherein, in the case where the first frame is received, the circuitry does not transmit or receive a frame in the frame exchange period.

8. The communication device according to claim 7, wherein the circuitry makes a decision about a shift to a stop state on the basis of a length of the frame exchange period and a length of recovery time from the stop state in which the frame is not transmitted or received to an operating state in which the frame is transmitted or received.

9. The communication device according to claim 8, wherein the circuitry decides whether to shift to the stop state on the basis of the length of the frame exchange period and the length of the recovery time.

10. The communication device according to claim 8, wherein
the stop state includes a plurality of stop states having different lengths of the recovery time, and
the circuitry decides a stop state that is a shift destination among the plurality of stop states on the basis of the length of the frame exchange period and the lengths of the recovery time.

11. The communication device according to claim 10, wherein a length of the recovery time with regard to the stop state has a negative correlation with an amount of electric power consumption in the stop state.

12. A communication device comprising
circuitry configured to transmit a first frame that includes information indicating a frame exchange period and information on whether the frame exchange period is changed.

13. The communication device according to claim 12, wherein, in the case where the frame exchange period is extended, the circuitry transmits a second frame that includes information indicating the frame exchange period that has been extended when the frame exchange period has elapsed.

14. The communication device according to claim 13, wherein the second frame includes information on whether the frame exchange period is changed.

15. A communication method executed in a communication device comprising:
receiving, by circuitry, a first frame from a first communication device, the first frame being addressed to a second communication device that is different from the communication device,
wherein the first frame includes information indicating a frame exchange period and information on whether the frame exchange period is changed.

16. A communication method executed in a communication device comprising:
transmitting, by circuitry, a first frame that includes information indicating a frame exchange period and information on whether the frame exchange period is changed.

17. The communication device according to claim 1, wherein the frame exchange period is a Network Allocation Vector period defined in IEEE802.11 standard.

18. The communication device according to claim 12, wherein the frame exchange period is a Network Allocation Vector period defined in IEEE802.11 standard.

19. The communication method according to claim 15, wherein the frame exchange period is a Network Allocation Vector period defined in IEEE802.11 standard.

20. The communication device according to claim 16, wherein the frame exchange period is a Network Allocation Vector period defined in IEEE802.11 standard.

* * * * *